United States Patent

[11] 3,549,968

[72] Inventor Fukuo Shibata,
13 Tokiwa-cho, Nishinomiya, Hyogo, Japan
[21] Appl. No. 832,549
[22] Filed May 21, 1969
Division of Ser. No. 624,119, Mar. 14, 1967, now abandoned.
[45] Patented Dec. 22, 1970
[32] Priority Mar. 14, 1966; Mar. 31, 1966
[33] Japan
[31] 41/16,008; 41/20,320

[54] ELECTRIC CONTROL SYSTEM FOR INDUCTION MACHINE CONTAINING WINDING ELEMENTS OF TWO WOUND ROTOR INDUCTION MACHINES
8 Claims, 3 Drawing Figs.

[52] U.S. Cl. .................................................... 318/197, 318/45, 318/237
[51] Int. Cl. ...................................................... H02p 7/36

[50] Field of Search ........................................... 318/45, 49, 50, 197, 225, 237

[56] References Cited
UNITED STATES PATENTS
| | | | |
|---|---|---|---|
| 2,201,006 | 5/1940 | Kilgore | 318/197X |
| 2,355,727 | 8/1944 | Hölters | 318/197X |
| 3,327,189 | 6/1967 | Hedstrom | 318/237X |

*Primary Examiner*—Oris L. Rader
*Assistant Examiner*—Gene Z. Rubinson

ABSTRACT: In an induction machine arrangement which contains two stator windings and two rotor windings rotating mechanically together with each other, controlled rectifiers are connected electrically between terminals of the two rotor windings, and the controlled rectifiers are divided into two groups, the anodes and cathodes of one group being connected respectively to terminals of one rotor winding and to terminals of another rotor winding, and the anodes and cathodes of the other group being connected electrically respectively to the latter terminals and to the former terminals.

Inventor Fukuo Shibata 3,549,968

ELECTRIC CONTROL SYSTEM FOR INDUCTION MACHINE CONTAINING WINDING ELEMENTS OF TWO WOUND ROTOR INDUCTION MACHINES

This is a division of application Ser. No. 624,119 filed Mar. 14, 1967, now abandoned.

This invention relates to electric control system for induction machines. An induction machine is an asynchronous alternating current machine which comprises a magnetic circuit interlinked with two electric circuits, or sets of circuits, rotating with respect to each other and in which power is transferred from one circuit to another by electromagnetic induction. Examples of induction machines are induction motors, induction generators, and certain types of frequency converters and phase converters.

More particularly, the invention is concerned with the control system of speed for induction machines, such as induction motors, over a wide range by employing rectifiers. Further, the invention is concerned with the control system for an induction machine operating as a generator by employing rectifiers.

In the control of induction machines by rectifiers, it is important to provide control systems by which the induction machines can be controlled as motors over wide speed ranges without sacrificing efficiency of operation, torque or economy of apparatus of the systems.

Heretofore, various arrangements have been devised which permit the control of induction motors by employing rectifiers which are electrically connected with the rotor or secondary windings of the induction motors. In general, the electric power taken from the rotor or secondary windings is either fed back to the AC source or fed to the main shaft of the induction motors. When it is fed back to the AC source, in the prior arrangements, torque or efficiency of operation is not so large in case of comparatively low speed control range, because a large part of the electric energy supplied on the input terminals of the induction motor is fed back to the AC source and is not converted into the mechanical torque.

When the electric power taken from the rotor is fed to the main shaft of the induction motor by using a direct current motor in the prior method, the efficiency of operation or economy of apparatus of the system is rather reduced.

It is one of the objects of this invention to provide a speed control system by which the induction machine can be controlled when acting as a motor over a wide speed range without sacrificing efficiency of operation, torque or economy of apparatus of this system.

In the control of induction machines it is important to provide control systems by which the induction machines can be controlled as brushless type motors or generators. It is another object of this invention to make a brushless type controllable induction machine acting as a motor or a generator.

In the control of frequencies of generators it is important to keep constant frequencies of generators which are driven by prime movers at speeds not always constant. So, it is further another object of this invention to provide a simple control system keeping a constant frequency of a generator which is driven by a prime mover at speed not always constant.

It is still another important object of this invention to provide a speed control system of very simple construction by which the induction machine can be controlled over wide speed range without sacrificing efficiency of operation.

This invention possesses many other advantages, and has other objects which may be made more clearly apparent from a consideration of several embodiments of this invention. For this purpose, there are shown a few forms in the drawings accompanying and forming part of the present specification. These forms will now be described in detail, illustrating the general principles of this invention, but it is to be understood that this detailed description is not to be taken in a limiting sense, since the scope of the invention is best defined by the appended claims.

Referring to the drawings.

The machine arrangement according to the invention comprises the following combination: two alternating current electric windings called a first winding and a second winding which are coupled electromagnetically with respect to each other and rotating with respect to each other; other two alternating current electric windings called a third winding and a fourth winding which are coupled electromagnetically with respect to each other and rotating with respect to each other; controlled rectifiers which are inserted and connected electrically between the terminals of the said second winding and the terminals of the said fourth winding; an alternating current bus connected electrically with the terminals of the first winding and with the terminals of the third winding; means for rotating mechanically the said second winding together with the said fourth winding; wherein the said controlled rectifiers are divided into two groups, the anodes and cathodes of one group being connected respectively to the terminals of the second winding and to the terminals of the fourth winding, and the anodes and cathodes of the other group being connected respectively to the terminals of the fourth winding and to the terminals of the second winding; further, two electric windings called a fifth and sixth windings are coupled electromagnetically with respect to each other; and the firing circuit which is connected to each gate or control element of the controlled rectifiers is supplied with signal electric power from the said alternating current bus through the said electromagnetically coupled fifth and sixth windings.

Figure 1:
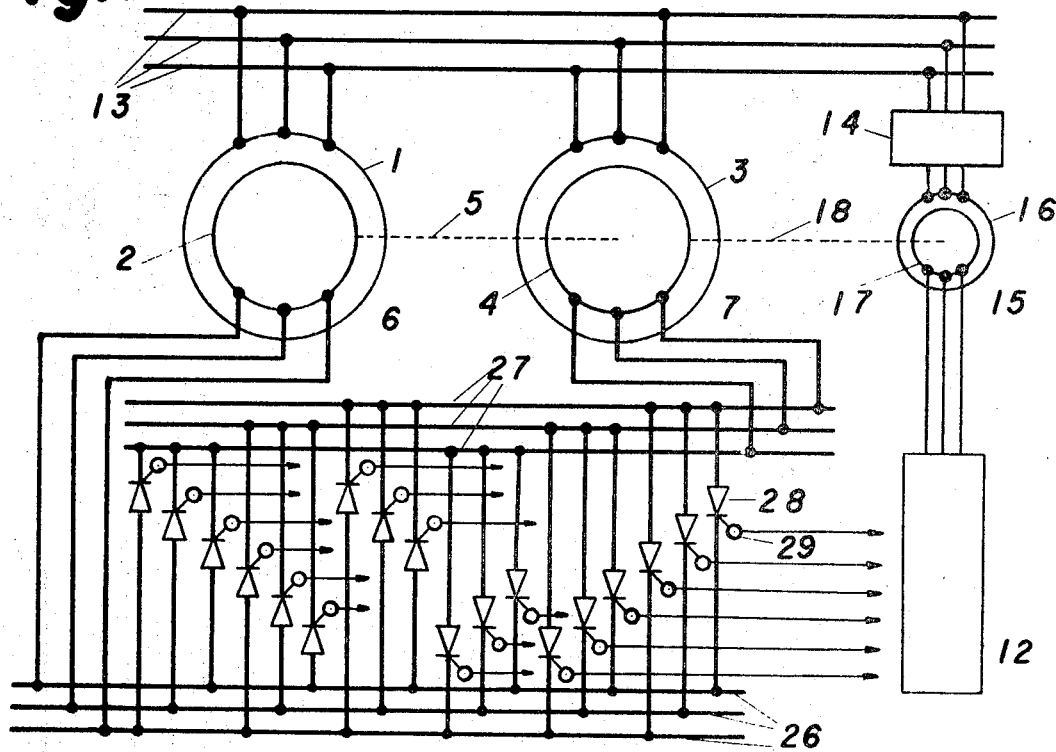
FIGS. 1 and 2 are system diagrams illustrating different forms of this invention, the systems being adapted to utilize any multiphase or single-phase electrical energy, all represented by three-phase lines on these diagrams.

In FIG. 1, two electric windings coupled electromagnetically with respect to each other are shown. These are; a first winding 1 and a second winding 2. These two windings 1 and 2 are coupled electromagnetically with respect to each other, and are arranged for rotating with respect to each other. Further, other two electric windings are shown in FIG. 1. These are a third winding 3 and a fourth winding 4. These two windings 3 and 4 are also coupled electromagnetically with respect to each other, and are arranged for rotating with respect to each other. The second winding 2 is in general embedded in slots on a surface of a rotor. The fourth winding 4 is also generally embedded in slots on a surface of another rotor. A dotted line 5 shows that the second winding 2 rotates mechanically together with the fourth winding 4. That is; the rotor including the second winding 2 is mechanically coupled with the rotor including the fourth winding 4. The phrase 'to couple mechanically' is herein defined as to connect the members so that the mechanical torque or power can be transferred between the members either with or without slip, for instance, by direct coupling (with bolt, pin etc.), a rubber coupling device or chain. We can consider an example of mechanical coupling between the rotor including the second winding 2 and the rotor including the fourth winding 4 as follows:

There are two induction machines 6 and 7 whose stationary windings are the first and the third wing windings (1 and 3) respectively and whose rotor windings are the second and the fourth windings (2 and 4) respectively: these rotors containing respectively the second winding 2 and the fourth winding 4 are coupled mechanically with each other, for instance by a direct coupling (with bolt, pin etc.) with gear or chain.

In all these cases, the second winding 2 rotates mechanically together with the fourth winding 4. Controlled rectifiers 28 are connected electrically between the terminals of the second winding 2 and the terminals of the fourth winding 4. In FIG. 1, semiconductor rectifiers can be used as controlled rectifiers 28. The terminals of the first winding 1 are connected electrically with the terminals of the third winding 3. When the alternating current bus 13 is supplied from an alternating current source, the first winding 1 and the third winding 3 are supplied with an alternating current from the alternating current source. The firing circuit 12 of each gate 29 of the controlled rectifiers 28 is supplied with electric energy from the alternating current bus 13 through a phase shift control device 14 and an induction machine 15. This induction machine 15 consists of a stationary winding 16 and a rotor winding 17. Although the stationary winding 16 and a rotor winding 17 form an induction machine 15 in FIG. 1, it is not always necessary to construct an induction machine. In practice, we can generally say that there can be provided with the fifth winding 16 and the sixth winding 17 in some embodiments of this invention. These two electric windings 16 and 17 are coupled electromagnetically with respect to each other and are arranged for rotating with respect to each other. The stationary fifth winding 16 is connected electrically with the alternating current bus 13 through the phase shift control device 14. The rotary sixth winding 17 is connected electrically with the firing circuit 12. The sixth winding 17 is mechanically coupled with the fourth winding 4. Therefore, the sixth winding 17 rotates together with the fourth winding 4. A dotted line 18 shows the mechanical coupling between the rotor of the fourth winding 4 and the sixth winding 17.

When the alternating current bus 13 is supplied with electric energy from the alternating current source, the first winding 1, the third winding 3 and the fifth winding 16 are supplied with electric current from the alternating current bus 13. So, the rotating fields are produced in the stators and the rotors of these induction machines 6, 7 and 15. We can arrange so that the direction of the rotation of the rotating field made by alternating current flowing in the first polyphase winding 1 is opposite to the direction of the rotation of the rotating field made by alternating current flowing in the third polyphase winding 3. The directions of the rotation of the rotors of the second winding 2, the fourth winding 4 and the sixth winding 17 are same with respect to each other.

In FIG. 1, the frequency of the control signal in the firing circuit (gate control circuit) 12 obtained from the alternating current bus through the phase shift control device 14 and the induction machine 15 matches with the frequency of the current through the terminals of the fourth winding 4 or of the controlled rectifiers 28, because the sixth winding 17 rotates together with the fourth winding 4 or the sixth winding 17 is arranged for coupling mechanically with the fourth winding 4, therefore the frequency of the voltage at the terminals of the sixth winding 17 is equal to that of the fourth winding 4. Thus the fourth winding 4 is supplied from the controlled rectifiers 28 having the same output frequency as the fourth winding 4.

The fourth winding 4 rotates in the third winding 3 in the region s(slip)>1, so that the fourth winding 4 revolves against the rotating field, when the direction of the rotation of the rotating field made by alternating current flowing in the third polyphase winding 3 is opposite to the direction of the rotation of the rotating field made by alternating current flowing in the first polyphase winding 1. In this case, the controlled rectifiers 28 work at a higher frequency than that of the alternating current bus 13.

Part of the slip power supplied from the controlled rectifiers 28 to the fourth winding 4 is fed back to the alternating current bus 13. A part of the electric power supplied from the alternating current bus 13 to the first winding 1 is converted into the mechanical power of the rotor containing the second winding 2, and another part of the electric power supplied from the alternating current bus 13 to the first winding 1 is fed to the fourth winding 4 through the second winding 2 and the controlled rectifiers 28. Thus, the mechanical power of the rotor containing the fourth winding 4 can be added to the mechanical power of the rotor containing the second winding 2 when the induction machine set 6—7 operates as a motor. The mechanical power of the rotor containing the second winding 2 or that of the rotor containing the fourth winding 4 is converted from the electric power which is absorbed from the electric power flow between the first winding 1 to the third winding 3 through the second winding 2, the controlled rectifiers 28 and the fourth winding 4. With mechanical and controlled rectifiers power limitations, the device permits continuous speed control from zero to the maximum speed near to the synchronous speed of the second winding 2. The speed of the rotor of the second winding 2 rotating together with the fourth winding 4 can be controlled by the control of the phase shift control device 14.

Figure 2:
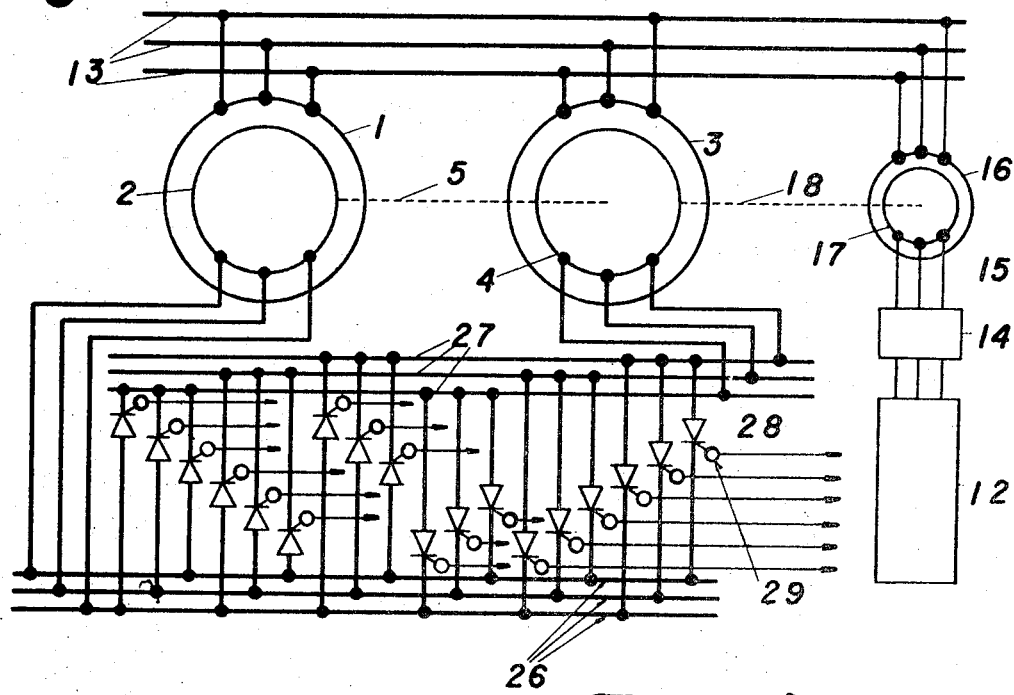

The arrangement of FIG. 2 is almost the same as that of FIG. 1, except that the phase shift control device 14 is inserted between the sixth winding 17 and the firing circuit 12 of the controlled rectifiers 28. Generally, the number of poles made by the first winding 1 must be the same as that made by the second winding 2, and the number of poles made by the third winding 3 must be the same as that made by the fourth winding 4.

When the first winding 1 is embedded in one stator and the third winding 3 is in the other stator, and further, the second winding 2 is embedded in one rotor and the fourth winding 4 is in the other rotor, if the direction of the rotation of the rotating field made by alternating current flowing in the third polyphase winding 3 is opposite to the direction of the rotation of the rotating field made by alternating current flowing in the first polyphase winding 1, the number of poles made by the first winding 1 may be the same as or different from that made by the third winding 3.

In FIG. 1, the terminals 26 of the second winding 2 are connected to the terminals 27 of the fourth winding 4 through eighteen controlled rectifiers 28. These controlled rectifiers are divided into two groups, the anodes and cathodes of one group being connected respectively to the terminals of the second winding 2 and of the fourth winding 4, and the anodes and cathodes of the other group being connected respectively to the terminals of the fourth winding 4 and of the second winding 2. The speed of the machine may be accurately controlled as a motor by means of a grid or gate control of the controlled rectifiers 28.

In operation, only the rectifier having the highest anode-cathode voltage can conduct at any one instant, and the portion of a cycle during which a rectifier is conducting is controlled by means of a voltage supplied to the control grid or gate. The control grids or gates of the individual rectifiers are supplied from the control unit 12 (or the firing circuit 12). A phase shift control device 14 is coupled electrically to the control unit (or firing circuit) 12 through the fifth winding 16 and the sixth winding 17 for the purpose of shifting the phase of the supplied grid (gate) voltages with respect to the alternating current supply in dependence upon a control signal supplied to the phase shift control device 14.

Thus the controlled rectifiers 28 permit power to be fed into the fourth winding 4 from the second winding 2, and the amount of power fed into the fourth winding 4 may be varied between almost zero and a maximum value by suitable variation of the control signal. Control of the motor set 6—7 is as follows. The torque of the motor 6 is directly proportional to the current flowing in the second winding 2, and this current is clearly a function of the e.m.f. induced in the second winding 2 and the amount of power fed into the fourth winding 4 from the second winding 2. The amount of power fed from the second winding 2 to the fourth winding 4 is controlled by the phase shift control device 14 in dependence upon the supplied control signal so as to vary the fraction of each cycle during which each rectifier conducts.

An important advantage of the arrangement of FIG. 1 is that even a commutation failure during feed of power will not lead to a short circuit because it is restricted to one phase of the rotor circuit, and the arc which has not been extinguished during commutation will be extinguished automatically at the end of the rectification period. If the minimum slip frequency of the second winding is 1 cycle per second, then the maximum duration of any over current due to commutation will be limited to less than one half second, and during normal operation with greater slip this time would be considerably less.

Figure 3:
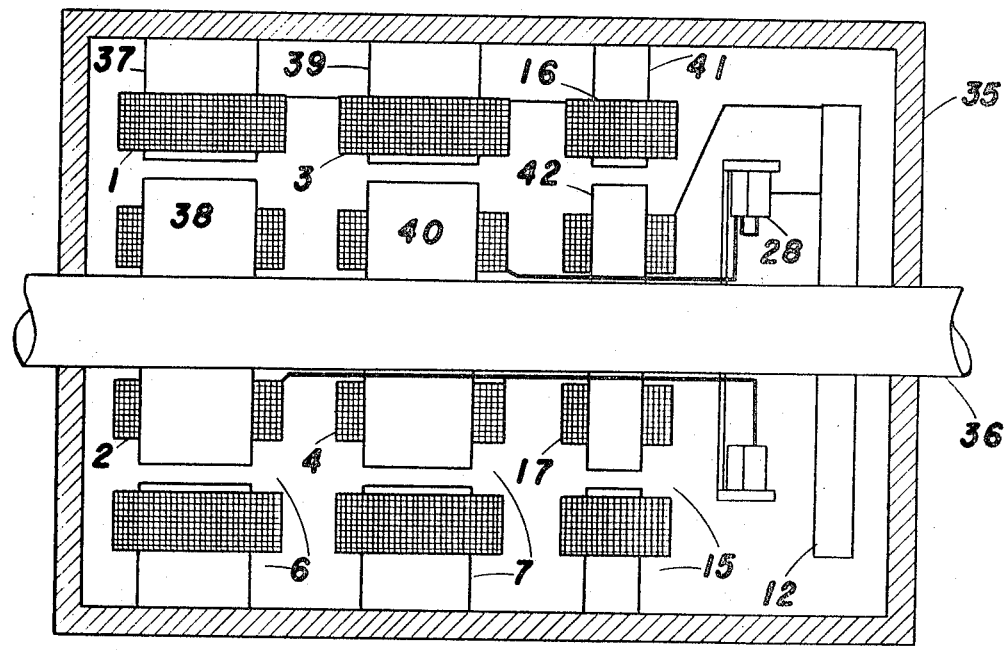
FIG. 3 is an example showing a construction according to this invention.

In FIG. 3 which is an example showing a construction according to this invention, the first winding 1 is on the surface of one stator core 37, the third winding 3 is on the surface of another stator core 39, and the fifth winding 16 is on the surface of still another stator core 41. The second winding 2 is on the surface of one rotor 38, the fourth winding 4 is on the surface of another rotor core 40, and the sixth winding 17 is on the surface of still another rotor core 42. In FIG. 3, these six kind of winding 1, 2, 3, 4, 16 and 17 are included in one case 35, and the three kind of windings 2, 4 and 17 are arranged for rotating around one shaft 36.

In FIG. 1, it is shown that the controlled rectifiers 28 and the firing circuit 12 form a unit which is connected electrically between the second winding 2 and the fourth winding 4. This unit can be either stationary or rotary. If it is installed in a static position outside the rotary part, it is necessary to provide sliprings on the terminals of the second winding 2 and the fourth winding 4 for connecting these winding 2 and 4 with the unit. If the above unit is arranged for rotating together with the second, the fourth and the sixth windings 2, 4, 17, it is not necessary to provide sliprings on the terminals of these windings 2, 4, 17, as shown in FIG. 3. In FIG. 3, the controlled rectifiers 28 are mechanically clamped or coupled with the rotor shaft 36 around which the controlled rectifiers 28 are mechanically driven together with the second, the fourth and the sixth windings 2, 4, 17.

Until now, we have mainly considered that induction machines containing the first, second, third and fourth windings in this invention can be driven as motors or electric couplings. However, the induction machines in this invention can be used also as induction generators. If the rotor containing the second winding 2 is driven at a speed more than its synchronous speed by a prime mover, the induction machine 6 operates as an induction generator. In this case, the synchronous speed (r.p.m.) of the second winding 2 means the speed obtained from the following formula.

$$(r.p.m.) = \frac{f \times 120}{p} \quad (1)$$

where $p$ is the number of poles of the first or the second winding, and $f$ is frequency of the alternating current bus 13.

In this case, if the alternating current bus 13 is supplied with electric power from the other alternating current source, the exciting current of the induction machine 6 can be supplied from the alternating current source (not shown in the FIG.).

If there is no alternating current source other than induction machines 6, 7 and 15, the exciting current of the induction generator 6 can be supplied from the third winding 3 through the alternating current bus 13. Ordinarily, the induction machine 7 is driven at a speed less than its synchronous speed, when the induction machine 6 operates as an induction generator. If the induction generator 6 is supplied with exciting current only from the induction machine 7, the frequency of the alternating current bus 13 can be controlled by the control of the phase shift control device 14.

The induction machine set shown in FIG. 3 can also be driven as an induction generator, which will be understood easily.

I claim:

1. An induction machine arrangement comprising in bination: two alternating current electric windings cal first winding and a second winding which are coupled tromagnetically with respect to each other and rotating respect to each other; other two alternating current el( windings called a third winding and a fourth winding whic coupled electromagnetically with respect to each othe rotating with respect to each other; controlled rectifiers \ are inserted and connected electrically between the tern of the said second winding and the terminals of the said f windings; an alternating current bus connected electr with the terminals of the first winding and with the tern of the third winding; means for rotating mechanically th second winding together with the said fourth winding; wh the said controlled rectifiers are divided into two group anodes and cathodes of one group being connected re tively to the terminals of the second winding and to th minals of the fourth winding, and the anodes and cathoc the other group being connected respectively to the tern of the fourth winding and to the terminals of the second ing; further, two electric windings called fifth and windings, are coupled electromagnetically with respe each other; and the firing circuit which is connected to gate or control element of the controlled rectifiers is sup with signal electric power from the said alternating cu bus through the said electromagnetically coupled fift sixth windings.

2. The combination as set forth in claim 1, in which t\ duction machines are formed: one is formed by the first ing embedded in one stator and the second winding emb( in one rotor, and the other is formed by the third windin bedded in the other stator and the fourth winding emb( in the other rotor.

3. The combination as set forth in claim 1, in which th and third windings are polyphase windings; and the dir( of the rotation of the rotating field made by alternatin; rent flowing in the first polyphase winding is opposite t of the rotating field made by alternating current flowing third polyphase winding.

4. The combination as set forth in claim 1, in whic number of poles made by the first winding is same a made by the third winding.

5. The combination as set forth in claim 1, in whic numberof poles made by the first winding is different that made by the third winding.

6. The combination as set forth in claim 1, in which a shift control device is electrically connected between the winding and the firing circuit of the controlled rectifiers.

7. The combination as set forth in claim 1, in which a shift control device is electrically connected with the winding.

8. The combination as set forth in claim 1, in which th trolled rectifiers are mechanically coupled or clampec the rotor shaft around which the controlled rectifie: mechanically driven together with the second, the fourt the sixth windings.